(12) United States Patent
Ambiru

(10) Patent No.: US 8,433,369 B2
(45) Date of Patent: Apr. 30, 2013

(54) MOBILE TERMINAL AND METHOD OF USING TEXT DATA OBTAINED AS RESULT OF VOICE RECOGNITION

(75) Inventor: Yasuhito Ambiru, Saitama-Ken (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 513 days.

(21) Appl. No.: 12/559,662

(22) Filed: Sep. 15, 2009

(65) Prior Publication Data

US 2010/0234072 A1 Sep. 16, 2010

(30) Foreign Application Priority Data

Mar. 16, 2009 (JP) ................. P2009-63196

(51) Int. Cl.
*H04B 1/38* (2006.01)
*H04M 1/00* (2006.01)

(52) U.S. Cl.
USPC ............ 455/563; 455/414.4; 455/556.1; 455/566; 455/569.1; 704/258; 704/260; 704/270; 704/273

(58) Field of Classification Search ........... 455/414.4, 455/556.1, 563, 566, 569.1; 704/256, 258, 704/260, 270, 273, 274
See application file for complete search history.

(56) References Cited

U.S. PATENT DOCUMENTS

2001/0018653 A1* 8/2001 Wutte ..................... 704/256
2007/0072592 A1* 3/2007 Kim ....................... 455/414.4
2009/0063152 A1* 3/2009 Munakata ................ 704/260
2009/0275365 A1* 11/2009 Lee et al. ................. 455/563

FOREIGN PATENT DOCUMENTS

| JP | 2000-270056 A | 9/2000 |
| JP | 2001-268206 A | 9/2001 |
| JP | 2003-143256 A | 5/2003 |
| JP | 2005-039514 A | 2/2005 |
| JP | 2005-352730 A | 12/2005 |
| JP | 2006-295775 A | 10/2006 |
| JP | 2007-306293 A | 11/2007 |
| JP | 2008-158986 A | 7/2008 |
| JP | 2008-252742 A | 10/2008 |
| JP | 2009-031810 A | 2/2009 |

OTHER PUBLICATIONS

JP Office Action mailed on Aug. 28, 2012 as received in application No. 2009-063196.
JP Office Action mailed on Dec. 11, 2012 in application No. 2009-063196.

* cited by examiner

*Primary Examiner* — Tuan Pham
(74) *Attorney, Agent, or Firm* — Maschoff Brennan

(57) ABSTRACT

A mobile terminal has a sound obtaining unit configured to obtain a sound signal; a voice recognition unit configured to recognize the sound signal and convert the sound signal into a text data; a display unit configured to display the text data divided in a plurality of units; a selection unit configured to receive a selection of one of the units from the text data divided in the plurality of the units displayed on the display unit; and a control unit configured to perform a predetermined process corresponding to each of the units selected by the selection unit.

16 Claims, 7 Drawing Sheets

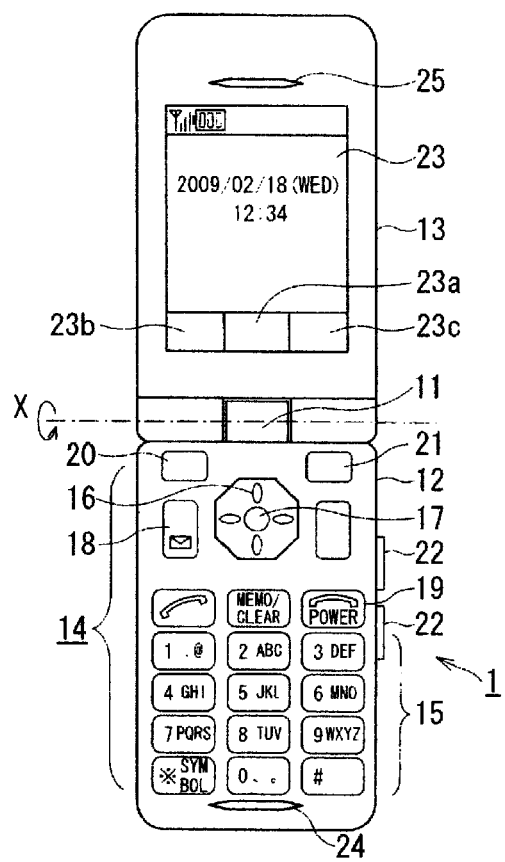
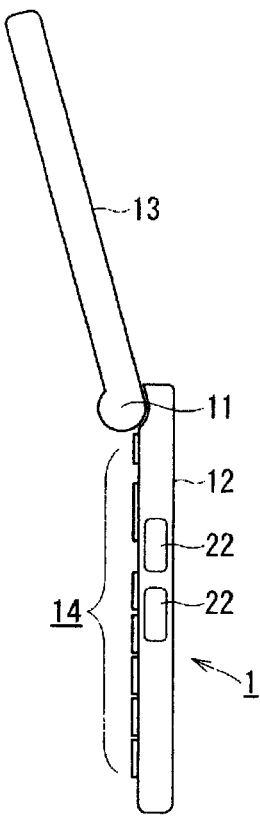
FIG. 1A      FIG. 1B
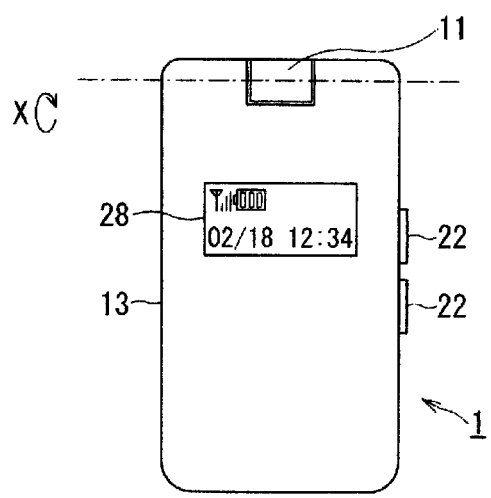
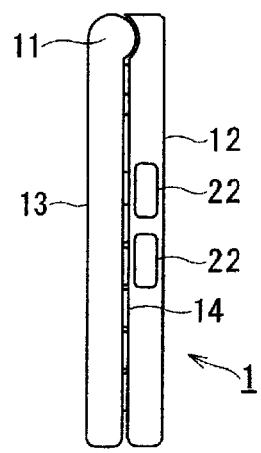
FIG. 2A      FIG. 2B

MOBILE TERMINAL AND METHOD OF USING TEXT DATA OBTAINED AS RESULT OF VOICE RECOGNITION

CROSS-REFERENCE TO RELATED APPLICATION

This application is based upon and claims the benefit of priority from the prior Japanese Patent Application NO. 2009-063196 filed on Mar. 16, 2009; the entire contents of which are incorporated herein by reference.

BACKGROUND OF THE INVENTION

1. Field of the Invention

The present invention relates to a mobile terminal, and more particularly, to a mobile terminal with a voice recognition function and a method of using text data obtained as a result of voice recognition.

2. Related Art

Some known mobile terminals including cellular phones have a function of recording voice during a phone conversation or at an arbitrary time. The function is referred to as a conversation memo function or a voice memo function. The functions are popular because users can use the functions as a memorandum when they want to record the conversation or have no writing instruments at hand.

In addition, a known conventional terminal apparatus has a function of receiving a sound signal in the form of a digital sound signal, recognizing the digital sound signal, and converting the digital sound signal into text data (see Japanese Unexamined Patent Application Publication No. 2003-143256, for example).

The technique disclosed in Japanese Unexamined Patent Application Publication No. 2003-143256 can also be applied to convert the conversation memo or the voice memo into the text data. Converting sound, such as the conversation memo, into the text data is advantageous because the content of the conversation memo can be more clearly checked. For example, in the case where the conversation memo contains information that will be needed later by a user (such as a telephone number and an e-mail address), the user can more accurately check by seeing the displayed text data representing the information than by hearing the reproduced conversation memo.

However, the voice recognition function cannot always convert voice into text data with perfect accuracy and may convert into erroneous text data. For example, when the surroundings are noisy, or the pronunciation is unclear, the conversion into the text data may be inaccurate.

Japanese Unexamined Patent Application Publication No. 2003-143256 does not make mention of the accuracy of conversion into text data by the voice recognition function and does not disclose any solution to the problem. Furthermore, the terminal apparatus disclosed in Japanese Unexamined Patent Application Publication No. 2003-143256 can only simply display the content of the conversation in the form of the text data.

SUMMARY OF THE INVENTION

The present invention has been accomplished in view of the above circumstances, and an object of the present invention is to provide a mobile terminal that can effectively use a text data obtained as a result of a voice recognition.

The above and other objects can be achieved according to the present invention by providing the mobile terminal, comprising: a sound obtaining unit configured to obtain a sound signal; a voice recognition unit configured to recognize the sound signal and convert the sound signal into a text data; a display unit configured to display the text data divided in a plurality of units; a selection unit configured to receive a selection of one of the units from the text data divided in the plurality of the units displayed on the display unit; and a control unit configured to perform a predetermined process corresponding to each of the units selected by the selection unit.

In another aspect of the present invention, there is also provided a mobile terminal comprising the steps of: obtaining a sound signal; voice recognizing the sound signal and converting the sound signal into a text data; displaying the text data divided in a plurality of units; receiving a selection of one of the units from the text data divided in the plurality of the displayed units; and performing a predetermined process corresponding to each of the selected units.

A mobile terminal according to the present invention can effectively use a text data obtained as a result of a voice recognition.

BRIEF DESCRIPTION OF THE DRAWINGS

FIGS. 1A and 1B show external configurations of a foldable cellular phone as an example of a mobile terminal according to the present invention;

FIGS. 2A and 2B show other external configuration of the foldable cellular phone shown FIGS. 1A and 1B;

DETAILED DESCRIPTION OF THE PREFERRED EMBODIMENTS

Figure 3:
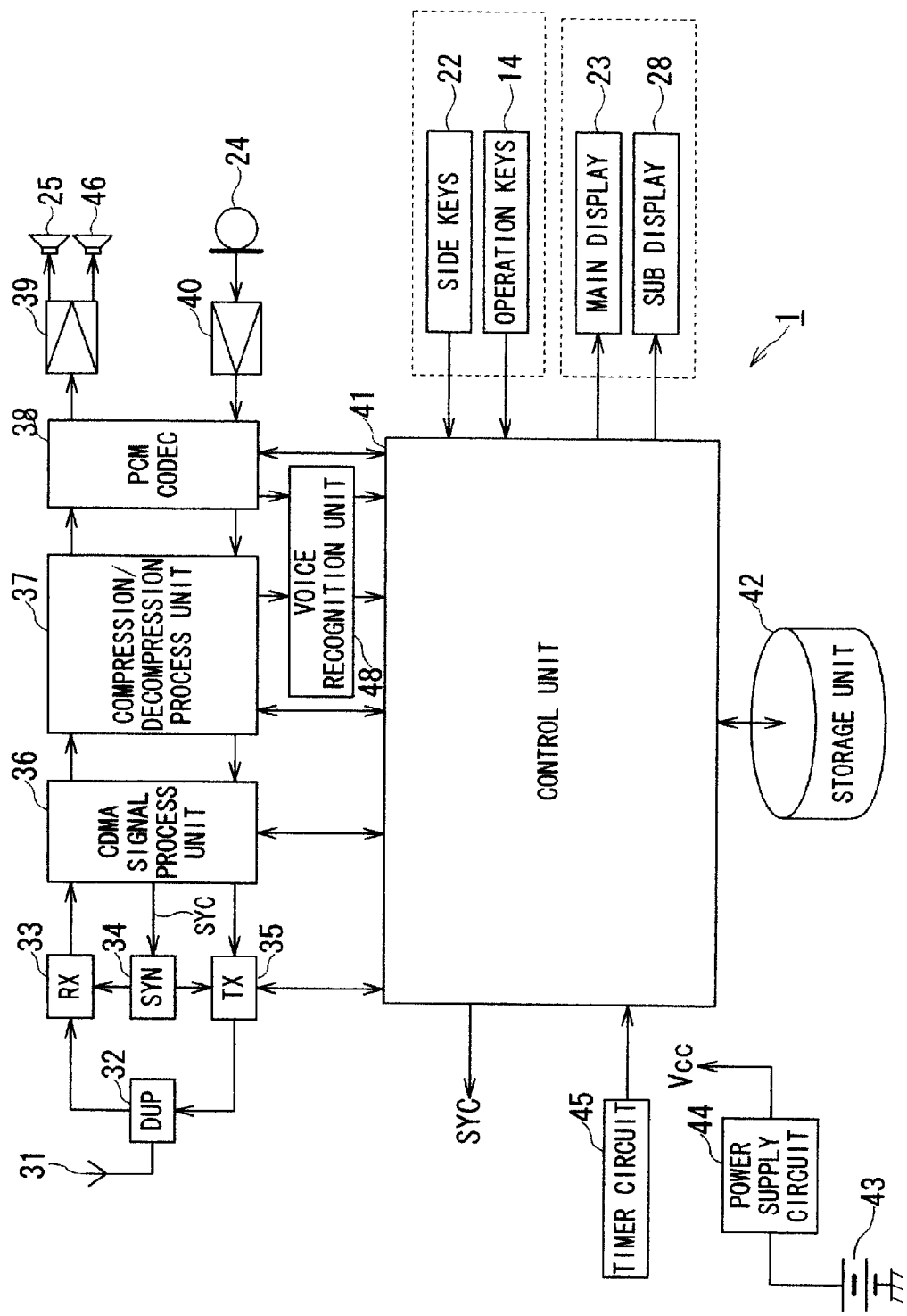
FIG. 3 is a block diagram of an internal configuration of the cellular phone as an example of the mobile terminal according to the prevent invention.

A mobile terminal according to an embodiment of the present invention will be described below, with reference to the appended drawings.

FIGS. 1A and 1B show external configurations of a foldable cellular phone as an example of mobile terminal according to the present invention. FIG. 1A is a front view of the cellular phone 1 which is an open state at substantially 180 degrees. FIG. 1B is a side view of the cellular phone 1 which is in the open state.

Referring to FIGS. 1A and 1B, the cellular phone 1 includes a first housing 12 and a second housing 13 which are connected by means of a center hinge portion 11 so as to realize the structure foldable in an arrow direction X. An antenna for signal transmission/reception (an antenna 31 in FIG. 3) is installed at a predetermine position inside the cellular phone 1. The cellular phone 1 communicates the electronic wave with a base station (not shown) via the built-in antenna.

The first housing 12 is provided with operation keys 14. The operation keys 14 mainly include numeric keys 15, arrow keys 16, an enter key 17, an e-mail key 18, a power key 19, a left soft key 20, a right soft key 21.

The numeric keys 15 are accepted any input of numbers from "0" to "9", alphabets from "A" to "Z", for example.

The arrow keys 16 include four (up, down, left and right) keys (i.e., four-direction key). By operation the arrow keys 16 in the up, down, left and right directions, a cursor displayed on a main display 23 can be moved in the up, down, left and right directions. The enter key 17 is depressed to establish various functions. The enter key 17 is also assigned with accepting instructions for process displayed on an enter key function display area 23a provided below the main display 23.

The first housing 12 is provided with the left soft key 20 and the right soft key 21 above the arrow keys 16 and the enter key 17. The first housing 12 is further provided with side keys 22 on the side surface. The left soft key 20, the right soft key 21 and the side keys 22 are assigned with accepting various instructions by being pressed inward of the first casing 12. In particular, the left soft key 20 and the right soft key 21 are assigned with accepting instructions for process displayed in a left soft key function display area 23b and a right soft key function display area 23c provided below the main display 23.

The first housing 12 is provided with a microphone 24 below the operation keys 14. The cellular phone 1 collects user's voice with the microphone 24 when the user talks on the phone.

A not-shown battery pack is inserted to the back side of the first housing 12. If the power key 19 is depressed to power the cellular phone 1, a power is supplied to each circuit from the battery pack to make the cellular phone 1 operable.

The second housing 13 has the main display 23 on the front surface. The main display 23 display a reception state of a radio wave, a remaining battery level, text of the e-mail and text and image data of the website, etc. The main display 23 may be formed of a LCD (Liquid Crystal Display), an organic EL (Electro Luminescence) display, an inorganic EL display and a SED (Surface-conduction Electron-emitter Display).

The second housing 13 is provided at a predetermined position above the main display 23. The user can make a voice call with the receiver 25 and the microphone 24. Here, a speaker also is provided at a predetermined position in the cellular phone 1.

FIGS. 2A and 2B show other external configurations of the foldable cellular phone 1 shown FIGS. 1A and 1B. The cellular phone 1 shown FIGS. 2A and 2B is in a state of being folded in the arrow X direction from the state shown FIGS. 1A and 1B. FIG. 2A is a front view of the cellular phone which is in a close state. FIG. 2B is a side external view of the cellular phone 1 which is in the close state.

The second housing 13 has a sub-display 28 which is formed of the LCD, for example. The sub-display 28 displays a reception state of a radio wave, a remaining battery level and a current time, etc.

FIG. 3 shows internal configuration of the cellular phone 1. A radio signal transmitted from the base station is received by the antenna 31, passes through an antenna diplexer (DUP) 32, and it is input to a receiver (RX) 33. The receiver 33 may perform mixing of the received radio signal with a local oscillation signal output from a frequency synthesizer (SYN) 34 to down-convert the received radio signal into an intermediate frequency signal. Then, the receiver 33 generates a reception baseband signal by performing a quadrature (quadrature direction) on the down-converted intermediate frequency signal. The frequency of the local oscillation signal generated from the frequency synthesizer 34 is indicated by a control signal SYN output the control unit 41.

The reception baseband signal generated by the receiver 33 is input to a CDMA signal process unit 36. The CDMA signal process unit 36 is provided with a RAKE receiver (not shown). In the RAKE receiver, a plurality of paths included in the reception baseband signal are de-spread with respective spread codes (i.e., spread codes equivalent to those of spread reception signals). Then, after the phase in the despread signals of the respective paths in adjusted, the despread signals of the respective paths are coherent Rake combined by the RAKE receiver. A data train obtained through the RAKE combining is subjected to de-interleaving, channel decoding (error correction decoding), and binary data determination. With this operation, reception packet data having a predetermined transfer format can be obtained. The reception packet data is input to a compression/decompression process unit 37.

The compression/decompression process unit 37 is composed of a DSP (Digital Signal Processor). The compression/decompression process unit 37 separates the reception packet data output from the CDMA signal process unit 36 to respective media by a multiplexer/demultiplexer (not shown), and subjects the reception packet data of the separated media to a decoding process. For example, in a call mode, speech data included in the reception packet data and corresponding to spoken voice is decoded by a speech codec. If video data is including in the reception packet data, such as in case of a video phone mode, the video data is decoded by video codec. For example, if the reception packet data is download content, the download content is decompressed (expanded) and output to the control unit 41.

A digital speech signal obtained by decoding is supplied to a PCM codec 38. The PCM codec 38 PCM-decodes the digital signal output from the compression/decompression process unit 37, and outputs an analog speech signal obtained by the PCM decoding to a receiving amplifier 39. The analog speech signal is amplified by the receiving amplifier 39 and output by the receiver 25 or the speaker 46.

A digital video signal obtained through decoding performed by a video codec of the compression/decompression process unit 37 is input to the control unit 41. The control unit 41 causes the main display 23 (or the sub-display 28) to display a video image based on the digital video signal output from the compression/decompression process unit 37 through a not shown video RAM (for example, VRAM and the like). The control unit 41 causes the main display 23 to display via the RAM.

If the reception data is an e-mail message, the compression/decompression process unit 37 supplies the e-mail massage to the control unit 41. The control unit 41 causes a storage unit 42 to store the e-mail message supplied from the compression/decompression process unit 37. Then in response to the user's operation of the input unit, the control unit 41 reads the e-mail message stored in the storage unit 42 and causes the main display 23 to display the read e-mail message.

On the other'hand, in the call mode, a speaker's (user's) speech signal (analog speech signal) input to the microphone 24 is amplified to a proper level by a transmitting amplifier 40 and PCM-coding by the PCM codec 38. A digital speech signal obtained by the PCM coding is input to the compression/decompression process unit 37. An e-mail message, which is text data generated by the control unit 41, is also input to the compression/decompression process unit 37.

The compression/decompression process unit 37 may compression-code the digital speech signal from the PCM codec 38 in a format corresponding to a predetermine transmission data rate. Thus, speech data is generated. Also, the compression/decompression process unit 37 compression-codes the digital video signal from the control unit 41 so as to generate video data. Then, the compression/decompression process unit 37 causes the multiplexer/demultiplexer to multiplex the speech data and the video data into transmission packet data in accordance with a predetermined transmission format. The compression/decompression process unit 37 packetizes the data multiplexed in the multiplexer/demultiplexer.

The compression/decompression process unit 37 outputs the transmission packet data after the packetization to the CDMA signal process unit 36. When an e-mail message is output from the control unit 41, the compression/decompression process unit 37 similarly cause the multiplexer/demultiplexer to multiplex the e-mail message into transmission packet data.

The CDMA signal process unit 36 uses a spread code assigned to a transmission channel to perform spread spectrum process on the transmission packet data output from the compression/decompression process unit 37, and outputs an output signal generated by the spread spectrum process to a transmitter (TX) 35. The transmitter 35 modulates the signal after the spread spectrum process by using a digital modulation method such as a QPSK (Quadrature Phase Shift Keying) method. The transmitter 35 synthesizes the transmission signal after the digital modulation with the local oscillation signal generated from the frequency synthesizer 34 to up-convert the transmission signal into the radio signal. Then, the transmitter 35 high-frequency-amplifies the radio signal generated by the up-conversion so as to obtain the transmission power level indicated by the control unit 41. The high-frequency-amplified radio signal is supplied to the antenna 31 through the antenna diplexer 32 and transmitted to the base station from the antenna 31.

Further, the cellular phone 1 is provided with a timer circuit 45 indicating an exact current time and a predetermined time.

The control unit 41 includes, for example, a CPU (Central Process Unit), a ROM (Read Only Memory), and a RAM (Random Access Memory). The CPU executes various kinds of process in accordance with programs stored in the ROM or various application programs loaded from the storage unit 42 into the RAM. The CPU generates various control signals and supplies the generated control signals to the components in the cellular phone 1 to control the overall operation of the cellular phone 1. The RAM appropriately stores data necessary for the CPU to execute the various processes. Further, the control unit 41 also includes a video RAM that temporarily stores information about moving images displayed on the main display 23.

The storage unit 42 is, for example, a flash memory device, which is an electronically erasable and programmable read only memory, or an HDD (Hard Disc Drive). The storage unit 42 stores the various application programs executed by the CPU in the control unit 41 or various data groups. A power supply circuit 44 generates a predetermined operating power supply voltage Vcc based on a power of a battery 43 and supplies the voltage to each circuit portion. Further, the cellular phone 1 is provided with a timer circuit 45 indicating an exact current time and measuring the predetermine time.

A voice recognition unit 48 recognizes an input digital sound signal and converts the signal into a text data. The digital sound signal input to the voice recognition unit 48 is a digital sound signal derived from the voice of the other party transmitted from other terminals and expanded by a compression/expansion part 37 or a digital sound signal collected by a microphone 24 and output from a PCM codec 38. The voice recognition unit 48 outputs the text data resulting from the voice recognition to the control unit 41.

The voice recognition unit 48 can use a known voice recognition engine or the like that extracts an acoustic feature quantity and checks for match between the acoustic feature quantity and an entry of a dictionary. The voice recognition unit 48 can be adaptive to a specified speaker or an unspecified speaker.

A cellular phone 1 according to the embodiment has a so-called conversation memo function or voice memo function. The conversation memo function is to record the voice of the other party and/or the user of the cellular phone 1 during telephone conversation and reproduce the recorded voice after the telephone conversation. The voice memo function is to record the voice of the user or the sound around the cellular phone 1 collected by the microphone 24, for example, and reproduces the recorded voice or sound. The conversation memo function and the voice memo function are triggered and start recording or reproduction of voice or sound in response to a record or reproduce instruction issued by the user through an operation of the operation keys 14, for example.

The cellular phone 1 has a function of recognizing the voice (sound) recorded by the conversation memo function or the like and converting the sound into the text data. In addition, the cellular phone 1 can perform various kinds of processes using the recorded sound and the text data converted from the voice (sound).

In the following, various kinds of processes performed using the text data obtained by the cellular phone 1 will be described.

Figure 4:
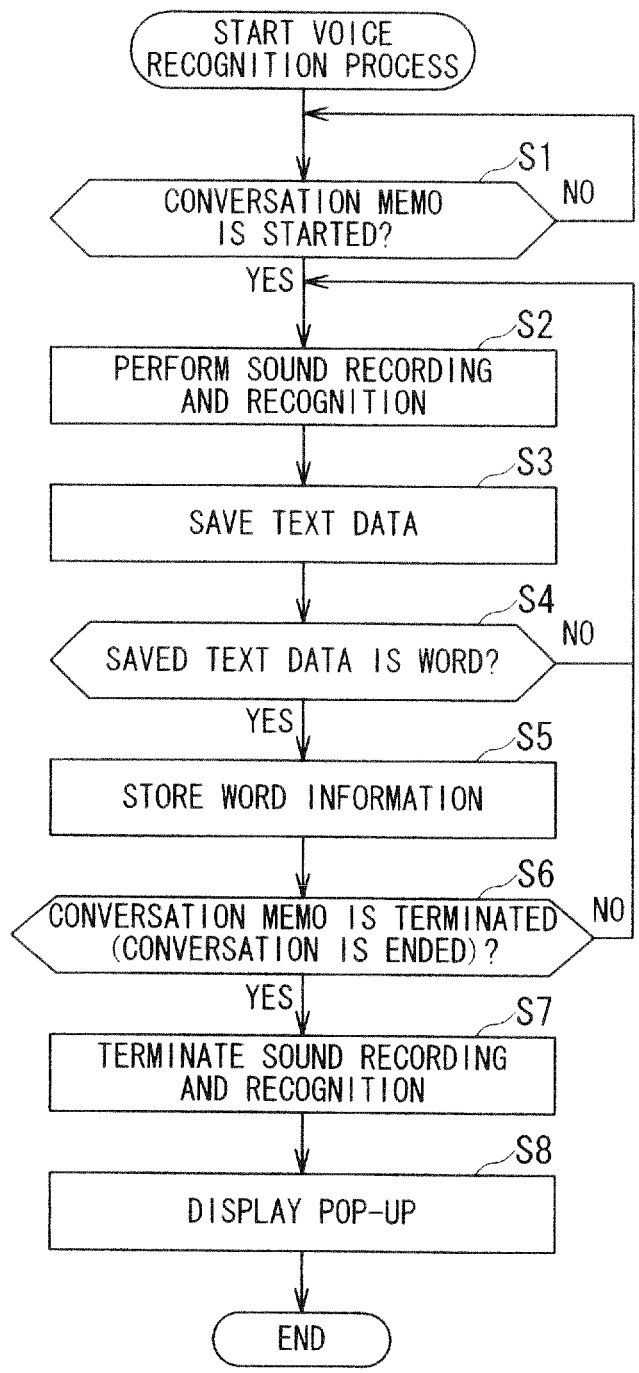
FIG. 4 is a flowchart for illustrating a voice recognition process executed by a control unit of the cellular phone according to the embodiment.

FIG. 4 is a flowchart for illustrating a voice recognition process performed by a control unit 41 of the cellular phone 1 according to this embodiment. The voice recognition process shown in FIG. 4 will be described with regard to a case where the conversation memo function is performed on the cellular phone 1 during voice conversation with the other terminal. Substantially the same process is performed when the voice memo function is performed on the cellular phone 1. Therefore, detailed descriptions of the case where the voice memo function is performed will be omitted herein.

In a step S1, the control unit 41 determines whether or not the control unit 41 receives an instruction to start the conversation memo function. If the control unit 41 determines that the control unit 41 receives no instruction to start the conversation memo function, the control unit 41 waits until the instruction is received.

If the control unit 41 determines that the instruction to start the conversation memo function is received, in a step S2, the control unit 41 obtains a digital sound signal derived from the voice of the other party (and/or the voice of the user the cellular phone 1) and stores the digital sound signal in a storage unit 42 (i.e., the sound is recorded as a sound data). At the same time, the voice recognition unit 48 recognizes the digital sound signal derived from the voice of the other party and converts the sound into the text data.

In a step S3, the control unit 41 saves the text data converted from the digital sound signal by the voice recognition unit 48. The text data is stored in a storage area of the storage unit 42, for example.

In a step S4, the control unit 41 determines whether or not the saved text data includes at least one unit recognizable as a single word. If the control unit 41 determines that the saved text data includes no the unit recognizable as a single word, the process returns to the sound recording and recognition step S2. The sound recording and recognition are continued until the text data that includes at least one unit recognizable as a single word is obtained.

In the case where the sound signal (i.e. the sound data) includes information about the destination of the communication, such as the telephone number and the e-mail address, the control unit 41 makes the determination as to whether the saved text data is recognizable as a single word by regarding one piece of information about the destination of the communication, such as the telephone number and the e-mail address, as one word.

If the control unit 41 determines that the text data that includes at least one unit recognizable as a single word is saved, in a step S5, the control unit 41 stores, as a single word information, an information about positions of a section of a single word in the text data and the sound data. The control unit 41 stores the single word information associated with the text data and the sound data per the units recognizable as a single word.

In a step S6, the control unit 41 determines whether or not the control unit 41 receives an instruction to terminate the conversation memo function. The conversation memo function is terminated in response to an instruction issued by the user through operation of the predetermined operation keys 14 or when the voice communication with the other terminal is ended.

If the control unit 41 determines that the control unit 41 receives no instruction to terminate the conversation memo function, the process returns to the sound recording and recognition step S2, and the subsequent processes is repeated.

If the control unit 41 determines that the control unit 41 receives the instruction to terminate the conversation memo function, in a step S7, the sound recording and recognition are terminated.

In a step S8, the control unit 41 issues a confirmation, to the user, that the sound data and the text data obtained by the conversation memo function are saved. For example, the control unit 41 issues the save confirmation by displaying a pop-up on the main display 23.

Figure 5:
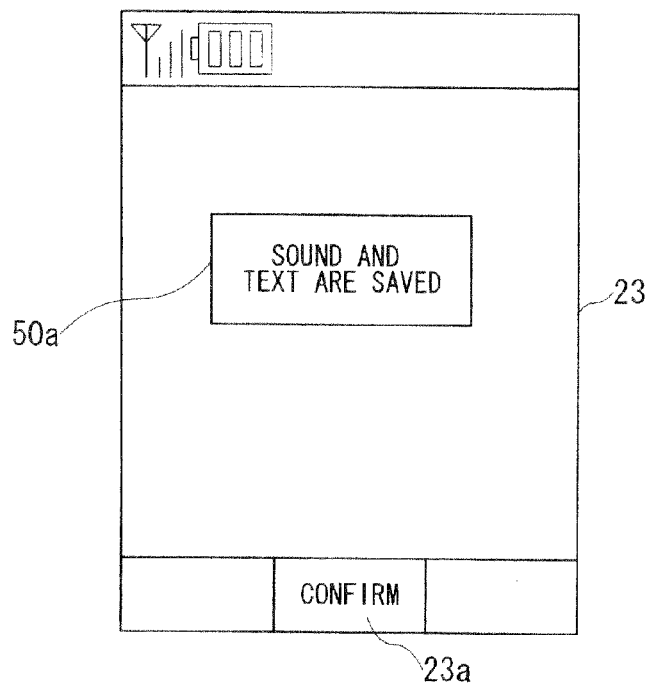
FIG. 5 shows an example of a main display on which a pop-up for save confirmation is displayed.
Figure 6:
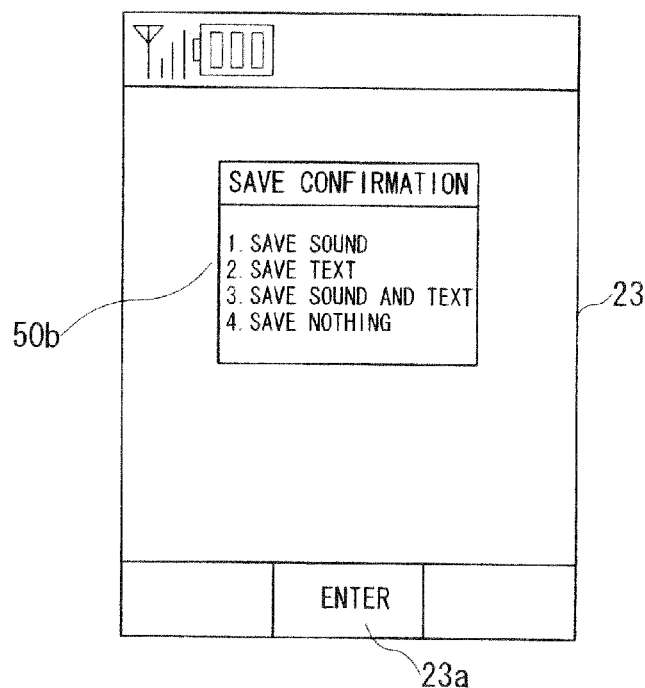
FIG. 6 shows another example of the main display on which a pop-up for save confirmation is displayed.

FIG. 5 shows an example of the main display 23 on which a pop-up for save confirmation is displayed. FIG. 6 shows another example of the main display 23 on which a pop-up for save confirmation is displayed.

As shown in FIG. 5, when recording by the conversation memo function is ended, the control unit 41 displays, on the main display 23, a pop-up 50a that indicates that the voice of the other party and the text data obtained as a result of voice recognition of the voice are saved. The enter key 17 is allocated the function of "CONFIRM" displayed in the enter key function display area 23a. The control unit 41 determines that the content of the pop-up 50a is confirmed when an input by the user through operation of the enter key 17 is received. Then, the control unit 41 terminates display of the pop-up 50a.

Alternatively, as shown in FIG. 6, the control unit 41 may display, on the main display 23, a pop-up 50b that causes the user to select the data to be saved. The options shown in the pop-up 50b include: (1) SAVE SOUND to save only the sound data; (2) SAVE TEXT to save only the text data; (3) SAVE SOUND AND TEXT DATA to save the sound data and the text data; and (4) SAVE NOTHING to save no data.

When any of the options shown in the pop-up 50b is selected by the user through an input operation on the arrow keys 16 and the enter key 17, the control unit 41 performs a process corresponding to the input operation.

In the case where the user selects (1) SAVE SOUND, the control unit 41 saves the sound data and deletes the text data saved in the text saving step S3. In the case where the user selects (2) SAVE TEXT, the control unit 41 saves the text data and deletes the sound data saved in the sound recording and recognition step S2. Further, in the case where the user selects (4) SAVE NOTHING, the control unit 41 deletes the text data and the sound data. Then, the control unit 41 terminates display of the pop-up.

Displaying the pop-up 50b that causes the user to select the data to be saved is advantageous because the user can select the data to be saved according to the necessity of the sound data and the text data or the available capacity of the storage area of the cellular phone 1.

In the sound recording and recognition step S2, the voice recognition unit 48 may perform a process to determine the success rate of the conversion from the sound data into the text data. In accordance with the success rate, the control unit 41 may save only the part of the sound data for which the determined conversion success rate is low. The sound data has a larger volume than the text data. Thus, in order to save the storage capacity, the text data corresponding to the part of the sound data for which the conversion success rate is high can be saved alone, whereas the text data corresponding to the part of the sound data for which the conversion success rate is low is saved in combination with the sound data so that the sound data can be checked by a sound reproduction process described later.

In the above description, in the word determination step S4, the control unit 41 determines whether or not the text data converted from the sound data includes at least one unit recognizable as a single word. However, the control unit 41 may determines whether the text data includes the unit recognizable as a phrase rather than a single word.

A voice recognition process has been described above.

Next, a process using the sound data and the text data obtained as the result of the voice recognition process shown in FIG. 4 will be described. The sound data and the text data obtained as the result of the voice recognition process can be output as required. In the following, a process performed when text data is displayed will be described.

Figure 7:
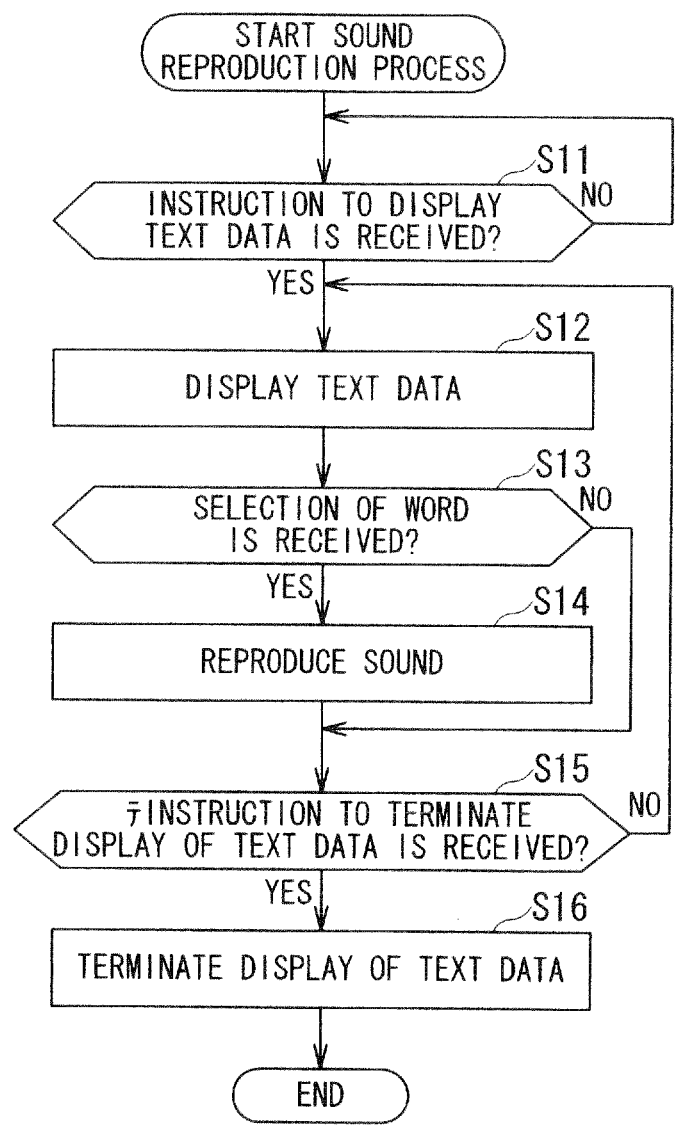
FIG. 7 is a flowchart for illustrating a voice reproduction process performed by the control unit of the cellular phone.

FIG. 7 is a flowchart for illustrating a sound reproduction process performed by the control unit 41 of the cellular phone 1 according to this embodiment. The sound reproduction process is to reproduce each unit of the sound data corresponding to a text selected by the user when text data is displayed.

In a step S11, the control unit 41 determines whether or not the control unit 41 receives an instruction to display the saved text data. If the control unit 41 determines that the control unit 41 receives no instruction to display the text data, the control unit 41 waits until the instruction is received.

If the control unit 41 determines that the instruction to display the text data is received, in a step S12, the control unit 41 displays the text data on the main display 23.

Figure 8:
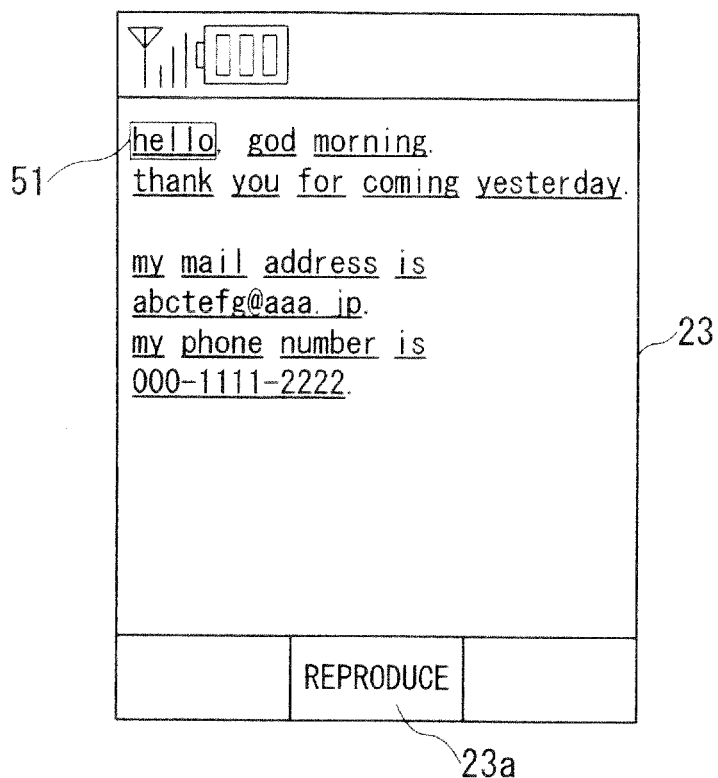
FIG. 8 shows an example of a text data displayed on the main display.

FIG. 8 shows an example of the text data displayed on the main display 23. The text data shown in FIG. 8 is the data converted from the voice data of the other party of the voice conversation.

The text data is displayed in such a manner that a part of the text data can be selected in units (data unit) composed of a single word based on the word information stored in the word information storage step S5 in the voice recognition process. In addition, the control unit 41 provides a hyperlink to the sound data for each of units of the text data based on the word information.

In a step S13, the control unit 41 determines whether or not the control unit 41 receives a selection of a single word (one unit) to be reproduced from the units of the text data. Single word selection is achieved by moving a cursor 51 to a desired word through operation of the arrow keys 16 by the user (the cursor 51 is placed at "hello" in FIG. 8) and then depressing the enter key 17. The enter key 17 is allocated the function of inputting an instruction to execute "REPRODUCE" displayed in the enter key function display area 23a.

If the control unit 41 determines that the control unit 41 receives no selection of single word, the process proceeds to a step S15.

If the control unit 41 determines that the control unit 41 receives selection of single word, in a step S14, the sound data corresponding to the selected text data is reproduced. The sound data is output from the receiver 25 or the speaker 46.

For example, the user can selectively reproduce a part of the sound data that is probably erroneously recognized, such as "god" (the correct word is g"oo"d) and the e-mail address "abctefg@aaa.jp" (the correct address is abc"d"efg@aaa.jp) of the words (units) in the text data shown in FIG. 8. The user can check whether or not the part of the text data is correctly converted from the sound data by hearing the correct sound.

The sound data to be reproduced may not be composed of one of the units selected from the text data alone and may include the selected unit and at least one of the units preceding and following the selected unit. Alternatively, the sound data to be reproduced may include several units within a predetermined time range around the selected unit.

For example, in the case where the word "god" is selected from the text data, the sound data corresponding to the text data including several units around the selected unit, such as "hello, god(good) morning. thank you", can be reproduced. This is advantageous because the user can check the sound by taking the context into account.

In the step S15, the control unit 41 determines whether or not the control unit 41 receives an instruction to terminate display of the text data. If the control unit 41 determines that the control unit 41 receives no instruction to terminate display of the text data, the process returns to the step S12, and the process from the display step S12 to the termination determination step S15 is repeated until the termination instruction is received.

If the control unit 41 determines that the control unit 41 receives the instruction to terminate display of the text data, in a step S16, the control unit 41 terminates display of the text data, and the sound reproduction process is ended.

Next, a process performed when the text data includes a text recognizable as communication destination information, such as the telephone number and the e-mail address will be described.

Figure 9:
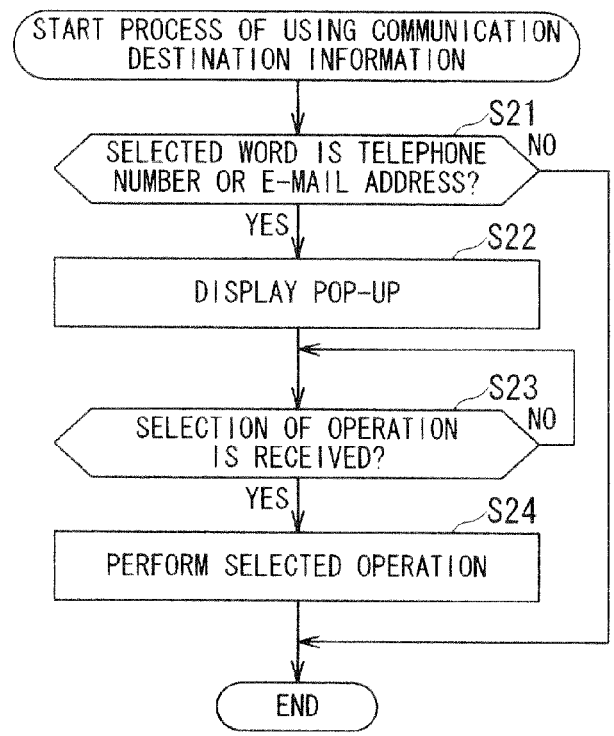
FIG. 9 is a flowchart for illustrating a process of using communication destination information performed by the control unit of the cellular phone.

FIG. 9 is a flowchart for illustrating a process of using communication destination information performed by the control unit 41 of the cellular phone 1 according to this embodiment. In the following, the process of using communication destination information will be described as a process performed in the case where a single word (unit) is selected from the text data displayed on the main display 23 in the selection determination step S13 in the sound reproduction process described above.

In a step S21, the control unit 41 determines whether the selected word is the communication destination information, such as the telephone number and the e-mail address. If the control unit 41 determines that the selected word is not the communication destination information, the process of using communication destination information is ended.

If the control unit 41 determines that the selected word is the communication destination information, in a step S22, the control unit causes the main display 23 to display a pop-up that causes the user to select the operation to be performed for the selected communication destination information.

Figure 10:
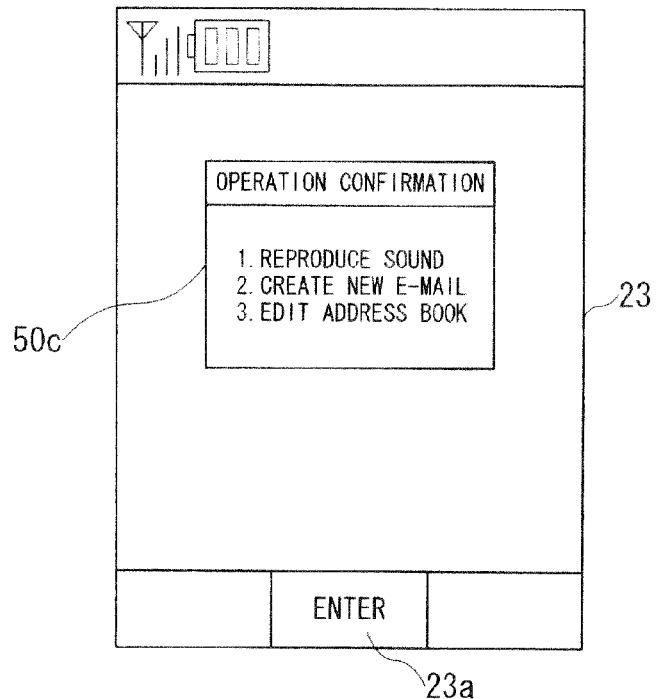
FIG. 10 is an example of a pop-up for confirmation of an operation to be performed for the communication destination information.

FIG. 10 is an example of the pop-up for confirmation of the operation to be performed for the communication destination information. With reference to FIG. 10, the case where the e-mail address is selected from the displayed text data will be described below as an example.

As shown in FIG. 10, a pop-up 50c for confirmation of the operation to be performed for the selected e-mail address is displayed on the main display 23. The options shown in the pop-up 50c include: (1) REPRODUCE SOUND to reproduce the sound data corresponding to the e-mail address; (2) CREATE NEW E-MAIL to create a new e-mail destined to the e-mail address; and (3) EDIT ADDRESS BOOK to register the e-mail address in the address book as a contact address.

In the case where the telephone number is selected from the text data, the option (2) CREATE NEW E-MAIL is replaced with another option (2) MAKE CALL. However, the remainder of the pop-up 50c is the same as in the case of the e-mail address is selected, so that description thereof with reference to the drawing will be omitted herein.

In a step S23, the control unit 41 determines whether or not the control unit 41 receives selection of one operation to be performed from the displayed pop-up. If the control unit 41 determines that the control unit 41 receives no selection of any operation, the control unit 41 waits until the selection is received.

If the control unit 41 determines that the control unit 41 receives selection of one operation, in a step S24, the control unit 41 performs the selected operation.

In the case where the control unit 41 receives selection of the sound reproduction operation, the control unit 41 reproduces the sound data corresponding to the selected communication destination information. In the case where the control unit 41 receives selection of the operation of making a call or creating a new e-mail, the control unit 41 performs a process of making a call to the selected telephone number or a process of creating a new e-mail destined to the selected e-mail address. Furthermore, in the case where the control unit 41 receives selection of the operation of editing the address book, the control unit 41 performs a process of displaying a screen for editing the address book to register the selected telephone number or e-mail address as a contact address.

Furthermore, in the case where the sound data is the conversation memo, and where the control unit 41 receives selection of the operation of editing the address book, the control unit 41 may also cause the user to edit the address book to add the selected telephone number and e-mail address (the communication destination information) to each of existing contact address. In general, the cellular phone 1 records the telephone number of the other terminal of the other party of in voice conversation as the history of incoming or outgoing calls. The control unit 41 searches, by use of the history, the contact address of the other terminal in the address book. In the case where there is the telephone number of the other terminal in the address book, the control unit 41 may cause the user to edit the address book to add the communication destination information to existing contact address.

A process of using communication destination information has been described.

The cellular phone 1 can perform various kinds of processes using the text data obtained as a result of voice recognition of the sound data recorded by the conversation memo function or the voice memo function.

The cellular phone 1 can divide the text data into predetermined units, such as words and phrases, and selectively reproduce a part of the sound data corresponding to any desired division of the text data. For example, when there is a possibility that the text data includes an erroneous part, it can be easily checked whether or not the part is correctly converted by selectively reproducing the sound data corresponding to the part of the text data. This is advantageous because when the user wants to hear only the sound corresponding to a particular part of the text data, the entire sound data does not have to be reproduced, so that the time and effort to reproduce the sound data is reduced accordingly.

Furthermore, if the text data includes communication destination information, such as the telephone number and the e-mail address, the communication destination information can be used to perform a communication process, such as calling and e-mail creating, or editing the address book. Therefore, when the user wants to perform the communication process or edit the address book using the communication destination information included in the recorded sound data, the user is saved from having to write the information down on a memo pad or the like and then inputting the information to the cellular phone 1 with reference to the memorandum. That is, since the information included in the recorded sound data is converted into text data, various kinds of operations can be performed on the information without the need of a complicated operation (manipulation).

Furthermore, the text data converted from the sound data recorded by the conversation memo function can be checked from the conversation log shown in the history of incoming or outgoing calls. And the text data can also be checked from the history of sent or received e-mails. Because the text data converted from the sound data is expressed by characters as with the e-mail, the text data can be comfortably browsed in the same way as the e-mail. Furthermore, in the case where the sound data contains a part that relates to the e-mail (for example, a sentence "I will mail you later" or "Please reply"), the text data can be advantageously handled in the same way as the texts of the e-mails to check the message in the conversation memo against the other messages in the history of sent or received e-mails.

Furthermore, the text data obtained as a result of voice recognition and the text data divided into various units, such as words and phrases, is effectively used for an editing operation, or for adding to the conversion dictionary as a conversion candidate used when entering characters, for example.

The present invention is applicable to a PDA (Personal Digital Assistant), a personal computer, a portable game machine, a portable music player, a portable video player, and other such portable terminal including the recording function in addition to the cell phone.

A series of processing described in each embodiment of the present invention can be executed using hardware as well as software.

Further, although each embodiment describes an example of the processes executed on the time series in the order of description, the processes include processes executed in parallel or separately, not executed on the time series.

What is claimed is:

1. A mobile terminal, comprising:
a sound obtaining unit configured to obtain a sound signal;
a voice recognition unit configured to recognize the sound signal and convert the sound signal into a text data which is divided into a plurality of units;
a display unit configured to display the plurality of units of the text data produced by the voice recognition unit;
a selection unit configured to receive a selection of one of the plurality of units from the plurality of units of the text data displayed by the display unit; and
a control unit configured to perform a predetermined process corresponding to the one of the plurality of the units selected by the selection unit
wherein the predetermined process performed by the control unit includes a process of reproducing a portion of the sound signal corresponding to a portion of the text data containing the selected one of the plurality of units and reproducing a portion of the sound signal corresponding to a portion of the text data containing two or more units of the plurality of units preceding and following the selected unit.

2. The mobile terminal according to claim 1, wherein the display unit displays the text data divided in the plurality of units each composed of a single word.

3. The mobile terminal according to claim 1, wherein the display unit displays the text data divided in the plurality of units each composed of a phrase.

4. The mobile terminal according to claim 1, wherein:
the units of the text data include the unit composed of a telephone number; and
in the case where the selection unit receives the selection of the telephone number from the plurality of the units, the control unit performs the process of making a call to the telephone number.

5. The mobile terminal according to claim 1, wherein:
the units of the text data include the unit composed of an e-mail address; and
in the case where the selection unit receives the selection of the e-mail address from the plurality of the units, the control unit performs the process of creating an e-mail destined to the email address.

6. The mobile terminal according to claim 1, further comprising, an address registration unit configured to register contact addresses in an address book, wherein;
the units of the text data include the unit composed of a communication destination information; and
in the case where the selection unit receives the selection of the communication destination information from the plurality of the units, the control unit performs the process of editing the address book to register the communication destination information.

7. The mobile terminal according to claim 6, further comprising, a recording unit configured to record a telephone number of another terminal in a voice conversation,
wherein:
the sound obtaining unit obtains the sound signal from the voice conversation; and
in the case where the control unit determines, on the basis of the recorded telephone number of the other terminal, that the telephone number of the other terminal already exists as the contact address in the address book, the control unit performs the process of editing the address book to add the communication destination information to the existing contact address of the other terminal.

8. The mobile terminal according to claim 6, wherein, the communication destination information includes a telephone number and an e-mail address.

9. The mobile terminal according to claim 1, further comprising, a storage unit configured to store the text data as sent or received e-mails.

10. A method of using a text data obtained as a result of a sound recognition, comprising the steps of:

obtaining a sound signal;

voice recognizing the sound signal and converting the sound signal into a text data which is divided into a plurality of units;

displaying the plurality of units of the text data produced by the voice recognition unit;

receiving a selection of one of the plurality of units from the plurality of units of the text data; and performing a predetermined process corresponding to the one of the plurality of the selected units, wherein the predetermined process includes a process of reproducing a portion of the sound signal corresponding to a portion of the text data containing the selected one of the plurality of units and reproducing a portion of the sound signal corresponding to a portion of the text data containing two or more units of the plurality of units preceding and following the selected unit.

11. The method of using a text data obtained as a result of a sound recognition according to claim 10, wherein the text data is divided in the plurality of units each composed of a single word.

12. The method of using a text data obtained as a result of a sound recognition according to claim 10, wherein the text data is divided in the plurality of units each composed of a phrase.

13. The method of using a text data obtained as a result of a sound recognition according to claim 10, wherein:

the units of the text data include the unit composed of a telephone number; and in the case where the selection of one of the units from the plurality of the units is the telephone number, the process performed in the performing step is a process of making a call to the telephone number.

14. The method of using a text data obtained as a result of a sound recognition according to claim 10, wherein:

the units of the text data include the unit composed of an e-mail address; and in the case where the selection of one of the units from the plurality of the units is the e-mail address, the process performed in the performing step is a process of creating an e-mail destined to the e-mail address.

15. The method of using a text data obtained as a result of a sound recognition according to claim 10, further comprising, preparing an address registration unit configured to register contact addresses in an address book, wherein;

the units of the text data include the unit composed of a communication destination information; and in the case where the selection of one of the units from the plurality of the units is the communication destination information, the process performed in the performing step is a process of editing the address book to register the communication destination information.

16. The method of using text data obtained as a result of a sound recognition according to claim 15, further comprising, recording a telephone number of another terminal in a voice conversation, wherein:

the sound signal is obtained from the voice conversation; and in the case where the recorded telephone number of the other terminal already exists as the contact address in the address book, the process performed in the performing step is the process of editing the address book to add the communication destination information to the existing contact address of the other terminal.

* * * * *